Oct. 29, 1968
DENISE SIMONE ODETTE BLOMET NÉE SOULES ET AL  3,407,566
DEVICE FOR PACKING OBJECTS HAVING A CYLINDRICAL
OR PRISMATIC SHAPE
Filed Nov. 17, 1965
2 Sheets-Sheet 1
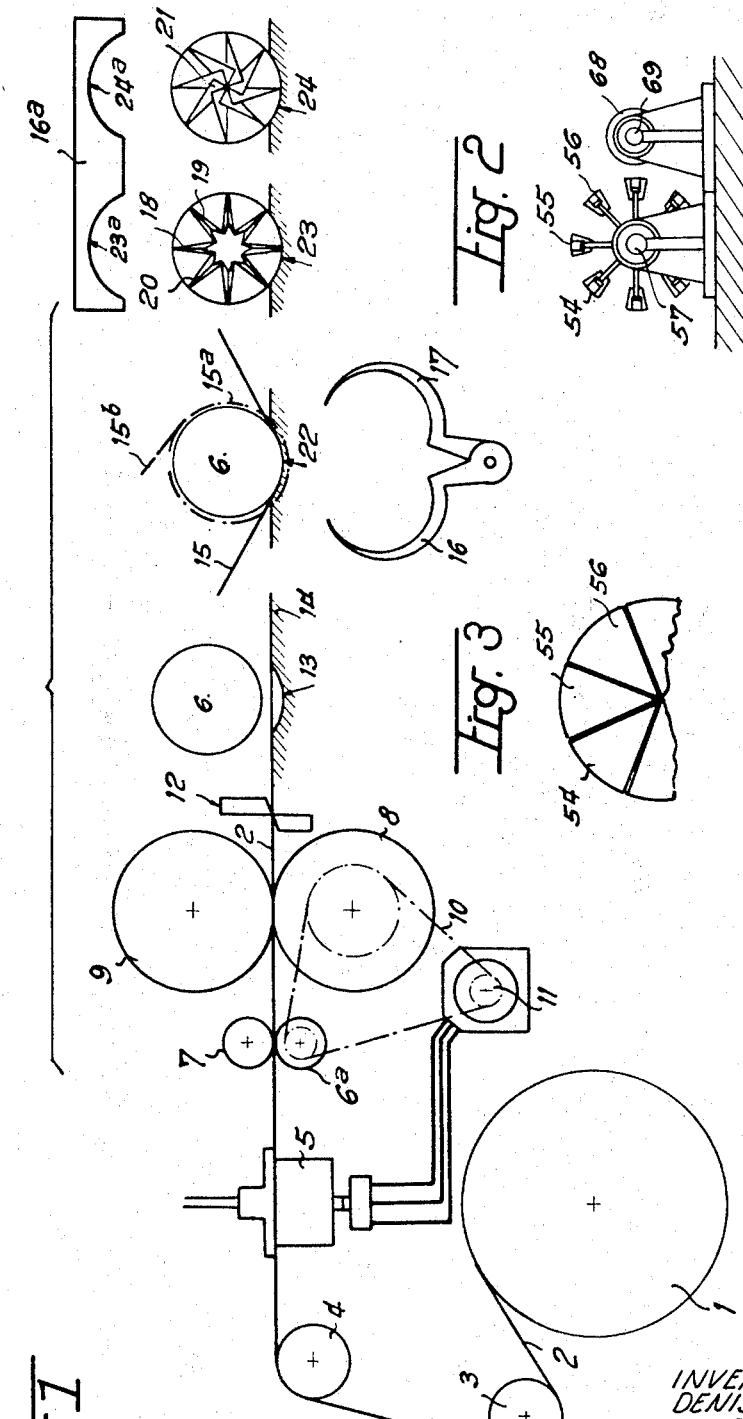
INVENTORS
DENISE SIMONE ODETTE
BLOMET née SOULES
GILBERT COINDREAU
BY
Woodhams, Blanchard & Flynn
ATTORNEYS

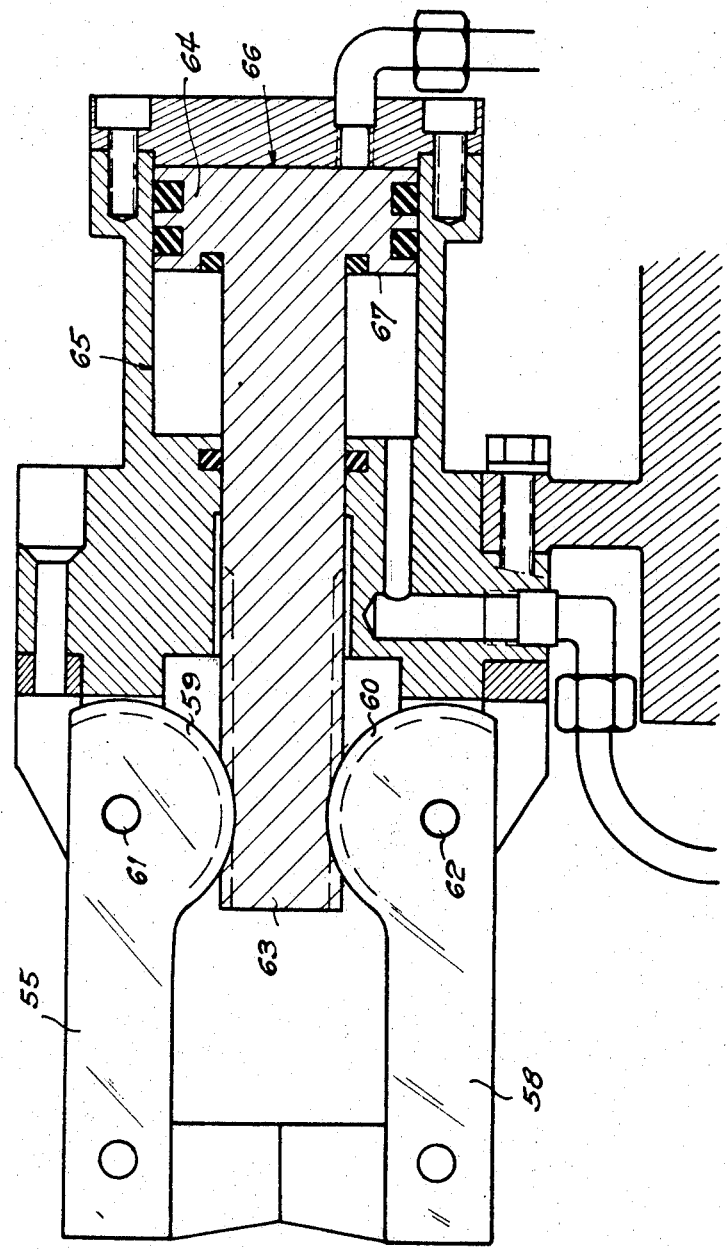

3,407,566
DEVICE FOR PACKING OBJECTS HAVING A CYLINDRICAL OR PRISMATIC SHAPE
Denise Simone Odette Blomet, née Soules, 2 Ave. de la Source a, Nogent-sur-Marne, and Gilbert Coindreau, La Germoniere a, Montamise, France
Filed Nov. 17, 1965, Ser. No. 508,299
Claims priority, application France, Nov. 19, 1964, 995,598
1 Claim. (Cl. 53—380)

ABSTRACT OF THE DISCLOSURE

A device for closing the ends of a cylindrical wrapper, said device having fingers actuated by a piston and adapted to be positioned adjacent each end of the wrapper. The fingers form radial pleats in the wrapper, which pleats are overlapped to provide a seal.

---

The present invention relates to a device for packing objects having a cylindrical or prismatic shape as previously rolled-up in a sheet of wrapping material which covers the lateral surface of the object and projects from the ends thereof, said device being of the type which comprises for each end of said object a system of articulated fingers disposed radially with respect to the axis of the object and movable angularly in concentric relation to said axis.

One object of the invention is to provide a simple and effective device which makes it possible to form at the ends of the object a perfect, uniform and attractive seal.

To this end, the device in accordance with the invention is characterized in that the articulated fingers have transverse cross-sections in the shape of circular sectors and in that the sides of said sectors are juxtaposed when the system is in the folded-back position, with the result that said device forms radial broken pleats at the ends of the wrapper which project beyond the ends of the object, means being provided for turning down said radial broken pleats against the ends of said object.

In one form of embodiment, said fingers are actuated by a piston which is movable within a cylinder to which said fingers are pivoted, the end of the piston-rod which extends outside the cylinder being cut in the shape of a toothed rack and adapted to cooperate with toothed sectors of said fingers.

As an advantageous feature, the means for turning down the radial broken pleats comprise, for each end of the object, a disc which is rotatable about an axis in coaxial relation with said object and which is movable axially into contact with said object.

There will now be described one form of embodiment of the invention as applied by way of example to a machine for wrapping rolls of butter, reference being made in the description to the accompanying drawings, in which:

FIG. 1 is a diagram of the machine;

FIGS. 2 and 3 are diagrammatic detail views; and

FIG. 4 is a longitudinal sectional view of the system of articulated fingers.

In the diagram of FIG. 1, there is shown at 1 the roll of paper which is intended to serve as wrapping material. The width of the sheet of paper 2 corresponds to the length of the piece of paper which is necessary for the purpose of wrapping a roll of butter. The sheet 2 passes over guide rolls 3 and 4 and beneath a detector unit which is generally designated by the reference numeral 5. Said sheet is drawn by two pairs of rolls 6a, 7, 8, 9, the rolls 6a and 8 being drive rolls which are driven in rotation by a chain or belt 10 from the output shaft 11 of a suitable motor. The starting of the motor is controlled by the detector unit 5.

The sheet of paper 2 then passes into the cutting unit 12 which is represented diagrammatically by cutting-blades and finally rests inside a recess 13 having the shape of a cylindrical segment and formed in a table 14. The individual wrapper obtained by cutting is designated by the reference numeral 15. The roll of butter 6 is conveyed, for example, by means of a claw-type handling system and brought over the sheet 15 and recess 13. The assembly which is thus formed is gripped from underneath by means of a pair of pincers having arms 16, 17, each of said arms having the shape of a circular arc. Said pincers are designed to grip the roll of butter from underneath and, as the arms close, accordingly serve to fold the longitudinal edges of the sheet of paper 15 over the roll of butter 6 as shown at 15a in chain-dotted lines, thus effecting the lateral wrapping of the roll of butter.

After having been thus wrapped laterally within the sheet 15 which projects from the ends of the roll, said roll of butter will be deposited first within a recess 23 in which, by virtue of the system in accordance with the invention, the ends of the sheet 15 which project from the ends of the roll of butter 6 will be shaped in uniform broken pleats 18, 19, 20, etc., then within a recess 24 in which said pleats will be turned down against the end face of the roll so as to form in overlapping relation a uniform star-shaped seal 21.

The recesses 23 and 24 are surmounted by a block 16a in which are formed channels 23a and 24a for the purpose of firmly maintaining the roll of butter 6 respectively in contact with the recesses 23 and 24.

The device in accordance with the invention is provided opposite the recess 23 and for each end of the roll of butter with a system of fingers 54, 55, 56, etc., (as shown in FIGS. 2 to 4) which are disposed radially with respect to a rotational axis or pin 57 (as shown in FIG. 2), the roll of butter being positioned in alignment with said axis and said fingers being adapted to move angularly and concentrically with said axis. Said fingers have transverse cross-sections in the shape of circular sectors and, as shown in FIG. 3, the sides of said sectors are contiguous when the system is in the folded-back position, with the result that, when said fingers close over the ends of the sheet 15 which project beyond the end of the roll of butter 6, they effect the formation of uniform broken pleats 18, 19, 20 etc., as previously mentioned. It should be noted that, by reason of the fact that said pleats are broken, that is to say when they have sharp edges and contiguous faces, they are not liable to come apart during transfer of the roll of butter from the recess 23 to the recess 24.

Opposite the recess 24, the system in accordance with the invention is provided for each end of the roll of butter with a disc 68 (as shown in FIG. 2) which rotates about an axis 69. The pack of butter is moved into alignment with said disc as it is deposited within the recess 24 after operation of the system of articulated fingers. Said disc 68 is movable axially into contact with the corresponding end-face of the roll of butter. As a result of its combined movement of translation and rotation, the disc 68 folds back the pleats 18, 19, 20, etc., of the end of the wrapper against the end-face of the roll of butter so as to form the uniform star-shaped seal 21. The wrapping operation is then completed and the roll of butter which has thus been packed is ready for withdrawal.

The system of articulated fingers is shown more clearly in FIG. 4. It can be seen that the fingers such as those designated by the reference numerals 55 and 58 are pivoted by means of pins such as those designated by the reference numerals 61 and 62 to a cylindrical body 65 in which moves a piston 64, the piston-rod 63 of which extends outside the cylinder coaxially with the system of fingers, is cut in the form of a toothed rack which is adapted to cooperate with toothed sectors such as those designated by the reference numerals 59 and 60, said toothed sectors being integral with said fingers and concentric with said pivot-pins.

Means are provided for conveying a fluid under pressure either onto the face 66 or onto the face 67 of the piston 64 so as to produce a movement of translation of said piston either in one direction or in the other and thus initiate the concentric closing or opening of the fingers.

As will be apparent, the invention is not limited to the form of embodiment which has been described and illustrated by way of example, the details of which can be modified without thereby departing either from the scope or the spirit of the invention.

It will also be understood that this invention can be extended to include within its scope any potential application for which it may be found suitable.

What we claim is:

1. Device for packing objects having cylindrical or prismatic shapes as previously rolled up in a sheet of wrapping material which covers the lateral surface of the object and projects from the ends thereof, wherein said system comprises for each end of said object a system of articulated fingers disposed radially with respect to the axis of the object and movable angularly in concentric relation to said axis, characterized in that said fingers are actuated by a piston which is movable within a cylinder to which said fingers are pivoted, the end of the piston-rod which extends outside the cylinder being cut in the shape of a toothed rack and adapted to cooperate with toothed sectors of said fingers, and also characterized in that said objects have transverse cross sections in the shape of circular sectors and in that the sides of said sectors are juxtaposed when the system is in the folded-back position, with the result that said device forms radial broken pleats at the ends of the wrapper which project beyond the ends of the object, means being provided for turning down said radial broken pleats against the ends of said object.

References Cited
UNITED STATES PATENTS

| | | | |
|---|---|---|---|
| 2,066,414 | 1/1937 | Milmoe | 53—380 XR |
| 2,440,391 | 4/1948 | Bogoslowsky | 93—36.8 |

TRAVIS S. McGEHEE, *Primary Examiner.*